(12) United States Patent
Hauck et al.

(10) Patent No.: US 7,249,262 B2
(45) Date of Patent: Jul. 24, 2007

(54) METHOD FOR RESTRICTING ACCESS TO A WEB SITE BY REMOTE USERS

(75) Inventors: Leon E. Hauck, Glendale, AZ (US); Brent J. Burval, Phoenix, AZ (US)

(73) Assignee: Browserkey, Inc., Phoenix, AZ (US)

( * ) Notice: Subject to any disclaimer, the term of this patent is extended or adjusted under 35 U.S.C. 154(b) by 615 days.

(21) Appl. No.: 10/139,924

(22) Filed: May 6, 2002

(65) Prior Publication Data

US 2003/0208562 A1 Nov. 6, 2003

(51) Int. Cl.
*H04L 9/00* (2006.01)
(52) U.S. Cl. .................. 713/184; 726/9; 713/185; 709/223; 709/219
(58) Field of Classification Search ........ 713/200–202, 713/182, 184–185; 709/217–219, 223; 726/9
See application file for complete search history.

(56) References Cited

U.S. PATENT DOCUMENTS

| | | | | |
|---|---|---|---|---|
| 4,796,220 A | | 1/1989 | Wolfe | 364/900 |
| 4,866,769 A | | 9/1989 | Karp | 380/4 |
| 5,199,066 A | | 3/1993 | Logan | 380/4 |
| 5,208,853 A | | 5/1993 | Armbruster et al. | 380/4 |
| 5,239,648 A | | 8/1993 | Nukui | 395/600 |
| 5,337,357 A | * | 8/1994 | Chou et al. | 705/56 |
| 5,490,216 A | | 2/1996 | Richardson, III | 380/4 |
| 5,560,008 A | | 9/1996 | Johnson et al. | 395/650 |
| 5,610,981 A | * | 3/1997 | Mooney et al. | 713/185 |
| 5,757,907 A | | 5/1998 | Cooper et al. | 380/4 |
| 5,784,460 A | | 7/1998 | Blumenthal et al. | 380/4 |
| 5,790,663 A | | 8/1998 | Lee et al. | 380/4 |
| 6,092,196 A | * | 7/2000 | Reiche | 726/6 |
| 6,134,593 A | | 10/2000 | Alexander et al. | 709/229 |
| 6,134,659 A | | 10/2000 | Sprong et al. | 713/190 |
| 6,141,696 A | | 10/2000 | Goertzel et al. | 709/310 |

(Continued)

FOREIGN PATENT DOCUMENTS

GB 1293857 A1 * 9/2001

*Primary Examiner*—Nasser Moazzami
*Assistant Examiner*—Fikremariam Yalew
(74) *Attorney, Agent, or Firm*—Fish & Richardson P.C.

(57) ABSTRACT

A method of restricting access to data maintained on a server computer by one or more authorized, networked client machines includes the step of installing a client-side software program on the client machine for generating a client machine-specific identifier determined by particular characteristics of the client machine. The machine-specific identifier is used by the server administrator to generate a unique password, which the user enters into the client-side software program. Server-side software is embedded on protected Web pages of the server computer that hosts the protected Web site. When a user desires access to protected content, the client-side software is prompted to re-generate its machine-specific identifier and valid client password list for comparison with the password previously entered by the user. Access is granted if they correspond, and denied if they do not. If the client machine is recognized as being authorized to access data on the protected Web site during a first access request, then the current session identifier is saved in a temporary storage table remote from the client machine for indicating current working sessions of authorized client machines. The client machine returns such session identifier with each additional request for access, and the temporary storage table is consulted to search for such session identifier before granting access.

18 Claims, 4 Drawing Sheets

U.S. PATENT DOCUMENTS 6,205,480 B1 * 3/2001 Broadhurst et al. ......... 709/225
6,226,752 B1 * 5/2001 Gupta et al. .................. 726/9
6,571,339 B1 * 5/2003 Danneels et al. .............. 726/9
6,668,322 B1 * 12/2003 Wood et al. ................. 713/182
6,691,232 B1 * 2/2004 Wood et al. ................... 726/6

* cited by examiner

METHOD FOR RESTRICTING ACCESS TO A WEB SITE BY REMOTE USERS

BACKGROUND OF THE INVENTION

1. Field of the Invention

The present invention relates generally to a client/server authentication system used with Internet or intranet Web sites and/or Web pages, mail servers, or file transfer protocol (FTP) servers, and more particularly, to such a client/server authentication system that ensures that the client is operating from a specific, pre-authorized client machine.

2. Description of the Related Art

There has long been recognized a need for increasing the security of Internet and intranet Web sites and/or selected Web pages accessible via such Web sites. In some instances, access must be restricted to particular authorized employees due to the confidential and sensitive nature of information stored on the server computer; this is likely the case in many corporate intranet systems, in which travelers and telecommuters need to log onto the intranet from remote locations. In other cases such as subscription-based Web sites, the data stored on the server has commercial value, and the owner of the Web site limits access to paying subscribers. In still other instances, such as on-line banking, access to portions of a financial institution's Web site must be limited to the authorized owner of a particular bank account.

Various security measures have been employed in the past to restrict the access of a client to data stored on a remote server. For example, it is common for Web site operators to save authorized user names and passwords, and to require the user to "log-in" by entering his or her user name and password in order to access information stored on the server. In other cases, the user must enter a key code assigned to the user. However, these security methods are easily defeated, as the user can provide his or her user name, password and/or key code to third parties, thereby allowing others to gain access to the "secured site" from virtually any personal computer. Likewise, if the user name and password and/or key code are stolen, then the thief can gain access to the system, at least until the user reports the theft of such information.

Another type of security measure that has been employed is a hardware-lock component, sometimes called a "dongle", which must be plugged into a port of the user's computer; the dongle provides a code that can be read by the user's computer and transmitted to the server computer to verify the identity of the user. Once again, however, such security measures are defeated if the owner of the hardware-lock component loans it to third parties, who can then access the restricted data from any available computer. In addition, such "dongles" are often lost or stolen, posing a substantial inconvenience to genuine authorized users, and creating additional opportunities for security breaches.

Accordingly, it is an object of the present invention to provide a client/server authentication system which provides an increased level of security.

Another object of the present invention is to provide such an authentication system which does not require the user to possess any special hardware components, or "dongles", in order to gain access to the server.

Still another object of the present invention is to provide such an authentication system capable of restricting a client to a particular personal computer or other client machine in order to gain access to a Web site and/or Web pages on an Internet and/or intranet site.

Yet another object of the present invention is to provide such an authentication system that easily allows for multiple levels of access wherein some authorized users have greater access to Web pages than other authorized users.

An additional object of the present invention is to provide such an authentication system that eliminates the need for the server administrator to store, or administer, user names, passwords or other user authentication data.

A further object of the present invention is to provide such an authentication system which avoids the necessity for a user to remember a user name, password and/or key code in order to gain authorized access to a protected site.

These and other objects of the present invention will become more apparent to those skilled in the art as the description of the present invention proceeds.

SUMMARY OF THE INVENTION

Briefly described, and in accordance with a preferred embodiment thereof, the present invention relates to a method of restricting access to data maintained on a server computer by an authorized client machine connected by a network to the server computer; often, the client machine is located remotely from the server computer. The novel method includes the step of installing a client-side software program on the client machine for generating a client machine-specific identifier. In the preferred embodiment of the present invention, this client-side software program is either downloaded from a remote computer (which could be the server computer that hosts the protected Web site or another remote computer) or installed from digital media (CDROM, DVD, floppy disk, etc.). The client machine-specific identifier is determined by identifying particular characteristics of the particular computer or other client machine upon which such client-side software program is installed. The client-side software program is operated on the client machine to generate the aforementioned machine-specific identifier. This machine-specific identifier is passed to a remote computer, or perhaps to a person, for generating a unique password based upon the machine-specific identifier; the unique password is then provided to the user of the client machine for use by the client-side software program. The remote computer used to generate the unique password may be a server computer that hosts a protected Web site, or it may be another computer remote from the client machine.

The method of the present invention preferably includes the step of installing a server-side software program on a server computer for generating the unique password described above. This server computer could be the same server computer that hosts the protected Web site, but could also be a different server computer for enhanced security. The client machine-specific identifier is transmitted to such server computer, and the server-side software program, installed on the server computer, generates the unique password. The server-side software program performs an algorithm for generating the unique password based upon the client machine-specific identifier generated by the client machine.

When a user desires access to data maintained on the server computer, the client-side software re-generates its machine-specific identifier. A comparison is then made, preferably by the client-side software itself, to compare the re-generated machine-specific identifier to the unique password saved by the user in the client machine. If the client-side software verifies that the re-generated machine-specific identifier properly corresponds with the unique password previously provided to such client-side software, then the client-side software recognizes the client machine as being authorized to access data maintained on the server computer. On the other hand, if the client-side software is unable to verify that the re-generated machine-specific identifier properly corresponds with the unique password previously provided to such client-side software, then the client-side software refuses to recognize the client machine as being authorized to access data maintained on the server. While it is preferred that the above-described comparison/verification process is performed at the client machine, the comparison/verification process can also be performed by the server computer that the user is trying to access.

Another aspect of the present invention relates to the use of a session identifier to control access to the protected data during a particular access session by an authorized client machine. In the example of a protected Web site served by Microsoft Internet Information Server (IIS®) software, a session identifier is created by the server computer each time a networked computer first requests access to such site for the purpose of indicating a particular working session for the requesting machine. In the case of known FTP servers, session IDs might not be created automatically; in this case, the server-side software program mentioned above includes a plug-in to the existing FTP server software for causing such a session identifier to be created. The session identifier of an authorized client machine is stored in the server computer, or in another computer remote from the client machine, in a temporary storage table along with additional data, such as an access level code, machine specific identifier, etc. In addition, the session identifier information is transmitted from the server computer to the client machine in the form of "cookie" data (in the example of protected HTTP protocol Web sites), and the client machine stores this transmitted "cookie" data containing the session identifier information.

Thereafter, each time the client machine requests access to the protected data during the same access session, the client machine sends the saved session identifier back to the server computer, as by including such session identifier information within the heading of the request. Each such request is transmitted in the form of an HTTP "header" that typically includes the site address (URL), previously stored cookie information particular to the user, and the session identifier. The server computer then compares the session identifier sent by the client machine with session identifiers already stored in the server computer's temporary storage table to determine whether a correspondence exists therebetween. If a correspondence exists between the session identifier sent by the client machine with session identifiers stored in the server computer temporary storage table, then the requested access is allowed. On the other hand, if there is no correspondence between the session identifier sent by the client machine with session identifiers already stored in the server computer's temporary storage table, then the requested access is denied. In this manner, a particular authorized client machine is allowed continued access to the protected data during the particular working session indicated by the session identifier. This method provides the advantage that the server computer need not maintain a permanent storage table of all authorized client machines.

The ability of the server computer to use only a temporary table of authorized users who are currently logged-on greatly simplifies the use of multiple servers that collectively serve up a protected site. For example, some Web sites are so large, have so many subscribers, or host so much content, that they require tens or hundreds of server computers to handle, and balance, the work load. If each of these tens, or hundreds, of server computers had to maintain a permanent table of authorized users, then significant administrative maintenance effort would be required to keep each such table up to date. In contrast, with the present invention, each such server would, at most, temporarily store the session identifiers of only those users currently engaged in an active session with such server. Administrative overhead can further be reduced by maintaining the temporary session ID table on a single master server, and allowing the other tens or hundreds of servers to query the temporary session ID table maintained on the master server to verify that a particular user request is authorized.

Another aspect of the present invention relates to providing different levels of access to different authorized client machines. For example, some users may be authorized to access all pages of a protected Web site, while other users may be limited to only lower (i.e., less secure, more public) levels of access to the protected data. While such site specific information could be maintained on a permanent basis on the server computer, this task would add to the complexity of the server-side software and maintenance. In the preferred embodiment of the present invention, the client-side software program installed on the client machine determines which areas, or sites, of the protected data residing on the server computer can be accessed by the particular client machine, as determined by its comparison of the password previously entered by the user versus the machine-specific identifier generated by the client-side software program. Such comparison can provide additional information beyond merely whether access is to be granted or denied; for example, this comparison can return information indicating the level of service to which a particular client is entitled, or whether the client's subscription to such service has already expired.

As mentioned, the client-side software program can generate access level information to indicate the particular data area(s) of the server computer which the client machine is authorized to access. Assuming that access was granted, then this access level information is transmitted by the client machine to the server computer's temporary storage table along with the initial request for access to the protected data during each access session. In response to a request to access protected data, the server computer compares the session identifier contained in the header of the request to the session identifier information that was saved in the server computer's temporary storage table during the initial request for access. The server computer determines whether a correspondence exists between the session identifier that was included in the header of the request for access sent by the client machine versus the session identifiers already stored temporarily in the server computer storage table. If so, then the temporary storage table can provide access level information which can be used by the server to control such client machine's access to only those levels of service to which such client machine is authorized. The server computer permits a client machine to access authorized levels of the requested site during a particular user access session if 1) the session identifier sent by the client machine matches the session identifier information already stored in the server computer's temporary storage table for such client machine, and 2) the access level requested by the client machine matches, or is at a "lower" level than, the access level already stored in the temporary storage table for such client machine; otherwise, the requested access is denied.

DETAILED DESCRIPTION OF THE PREFERRED EMBODIMENT

Figure 1:
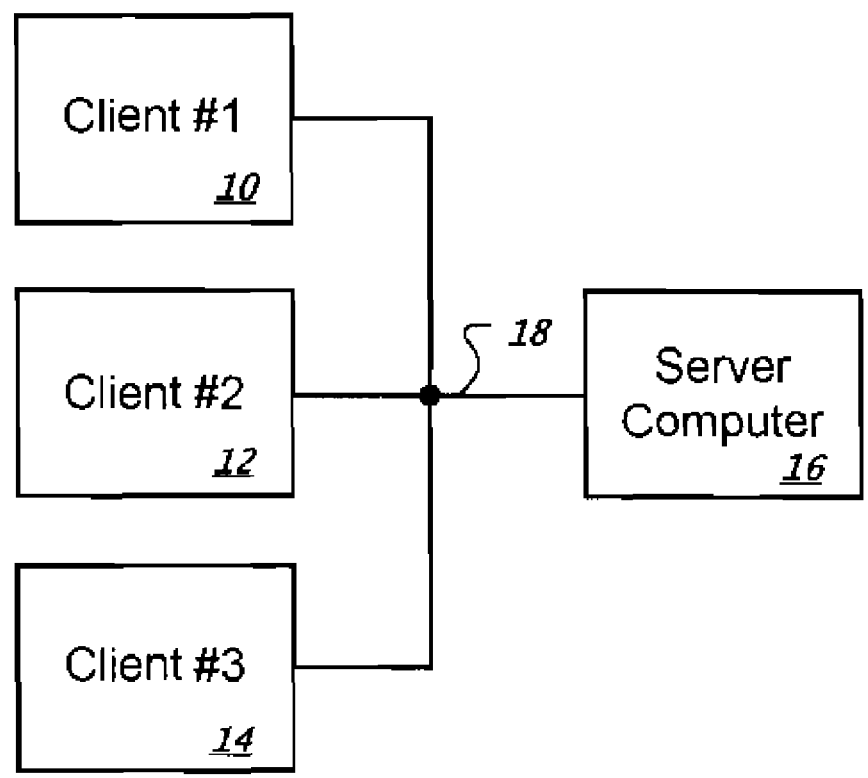
FIG. 1 is a block diagram showing a computer network connecting a series of client machines to a server computer.

The present invention relates to a client/server user authentication system used with Internet or intranet Web sites and/or Web pages that require a higher degree of security than typical static or dynamic username/password methods offer. The present invention is intended for server administrators who require absolute control over the access rights of client-machines connecting to their server(s) and/or client-machines accessing specific content being delivered by their server(s) in a network environment. Such client machines may be in the form of desktop or laptop personal computers, pocket computers, personal digital assistants, cellular telephones, cellular pagers, or any other electronic devices capable of communicating data over a network. The present invention is ideally suited for protecting subscription-type Web sites (such as adult content sites), on-line banking sites, and corporate intranets that allow remote access by tele-commuters and travelers. FIG. 1 broadly illustrates such a system wherein three different client machines 10, 12, and 14 are interconnected with a central server computer 16 by network 18. Network 18 can be a local area network; alternatively, it might represent a dial-up connection and/or a global computer network (wide area network) such as the Internet or a network similar thereto; network 18 could be a wired network or a wireless network.

In order to make use of the present invention, the server administrator installs a special server application on the server computer. This server application is set to automatically launch when the administrator's server machine is restarted. The server administrator also installs a programming code library (such as a dynamic link library, or DLL, in the Windows® environment) that is used to query the temporary storage table containing session identifiers (and other information) for authorized client machines. This code can be embedded within a protected Web page. A related grouping, or "content cluster", of such Web pages share a unique DLL defining such "cluster". This DLL thereby serves as a "key" specific to each such cluster. Two or more such DLLs can be used to distinguish between two or more clusters (e.g., two or more databases), offered on the same Web site. Similarly, two or more such DLLs can be used to distinguish between two sets of subscribers having the same access level but different subscription expiration dates. For instance, the programming code library embedded into each page of a protected cluster could be an ActiveX Dynamic Link Library (DLL) Object designed for an Active Server Page (ASP) page being served by a Microsoft Internet Information Server (IIS®). While the present invention can be used successfully with a host of operating systems, servers, and network environments, the preferred embodiment makes use of a Microsoft® Internet Information Server (IIS) Web server running Microsoft® Windows® being accessed by a user with a computer (client machine) running Microsoft® Windows® and a Java®-enabled Web browser.

A small "client-side" software application, or client tray application, must be installed and run on each client machine that is to have access to protected Web pages maintained by server 16 before such client machine can access protected Web content. Referring to the flowchart of FIGS. 2A, 2B, and 2C (hereinafter, "the FIG. 2 flowchart"), control starts at block 20 and passes to a decision diamond 22 to determine whether the aforementioned client tray application has already been installed on the user's client machine. If not, then a request is preferably communicated over the network by the client machine to the server for a download of the client tray application software, represented by box 24 in FIG. 2A. Incidentally, within the FIG. 2 flowchart, vertical dashed line 19 symbolically represents the division between a client machine (the process steps for which are shown on the left side of such dashed line) and the server computer (the process steps for which are shown on the rights side of such dashed line). It is not necessary that the client tray application be downloaded from the same server computer that maintains the protected Web pages; indeed, the client tray application could be obtained by a user from an entirely different computer by downloading or by email attachment, or via a CDROM, DVD, floppy disk, etc., mailed out by the operator of the server computer. Once the client tray application is downloaded or otherwise acquired by the user, the client tray application is installed on the user's client machine, as indicated by block 26 in FIG. 2A. Preferably, the client tray application is installed in a manner by which it is automatically launched in the background and remains resident within the memory of the client machine each time the client machine is "booted up". The user need only install the client tray application if it has not been previously installed. The same client tray application can be used to access content on any server protected by the method of the present invention. Thus, a given client machine, authorized to access two or more different subscription services, could make use of the same client-side software on the client machine to control access to each of such services. However, for each different service, the user would be issued a separate password, as described in greater detail below.

As mentioned above, an initial request for access to any IIS®-ASP-enabled Web page causes a unique session identifier to be created and returned to the user's client machine as a "cookie". An "entry Web page" on the server containing protected content includes software code, such as a Java® Applet, that is automatically downloaded to a client user's machine when access to such entry Web page is requested for the first time during the user's current session. This Java® applet is executed by the Web browser of the client user's machine with or without user intervention, and is either: 1) "digitally signed", or 2) set as originating from a "trusted" source upon the first visit made by any browser client application to each protected server/domain, as is the usual process for any Java® applet performing advanced client-machine processes. The Java® applet couples the client tray application (already running in the background on the user's client machine) with the aforementioned server application. The Java® applet communicates with the client-side tray application (which, in turn, communicates with the client machine key DLL described below) in order to determine whether this client machine is authorized to access any of the protected clusters maintained on this Web site. For example, the tray application might return an integer ranging from 0 through 10 (the "Integer Value"), wherein the value of the integer indicates what level of access is to be provided, whether the user's subscription has expired ("client expired"), etc. The Java® applet then updates the temporary storage table that contains valid session identifiers, assuming that access is to be granted. In other words, the temporary storage table stores information only for validated client machines. The temporary storage table preferably (at minimum) stores the Cluster Number, Session I.D. (Session identifier), Integer Value, date-time stamp (to facilitate purging of older/expired temporary records from the temporary storage table), and "anti-spoofing" checksum value(s) (including but not limited to client-machine calculated checksums calculated on 1) a date-time specific password string (to be verified by comparing the client-machine calculated checksum with a server calculated checksum calculated on the expected date-time specific password for the date-time that the Java Applet was served to the client), 2) the tray application executable file on the client-machine). Since all further access requests for Web pages hosted by this server during a particular Web browsing session automatically include the initial session identifier, the server can check the temporary storage table without requiring the Java® applet to execute, and without any further communication between the Java applet and the tray application. This specific Java®-based method minimizes firewall and proxy server problems that an end-user might otherwise experience if the tray application was designed to communicate directly with a remote server.

Each protected Web site (or each protected "content cluster" of each Web site) has a unique dynamic link library (DLL) associated therewith. This DLL is sometimes referred to herein as a "client machine key", and it is this DLL that generates the machine-specific identifier for the user's client machine. This client machine key DLL provides a virtually unique client machine identifier, and includes an algorithm for ensuring that the user enters a password uniquely corresponding to the unique client machine identifier before access to protected data is granted. If a user desires access to such protected Web site, or to the protected "content cluster", then the specific Web site DLL must exist on the user's client machine. It should be noted that the client tray application serves to couple the Java applet and the client machine key DLL. The client tray application detects whether the Web site DLL exists on the client machine, as indicated by decision diamond 30. If not, then a request is made to the Web site server, as represented by block 32, that the Web site DLL be downloaded to the client machine. The Web site server thereafter downloads such DLL to the client machine, and such DLL is installed by the client tray application, as indicated by block 34. The server administrator can group protected content into different "clusters" and use a different DLL, or client machine key, for each protected content cluster, if desired, enabling the Web administrator to use the present invention to perform multi-level access control. However, as described above, multi-level access control can also be provided by using the integer value returned by the client machine key DLL via the client tray application.

Figure 2A:
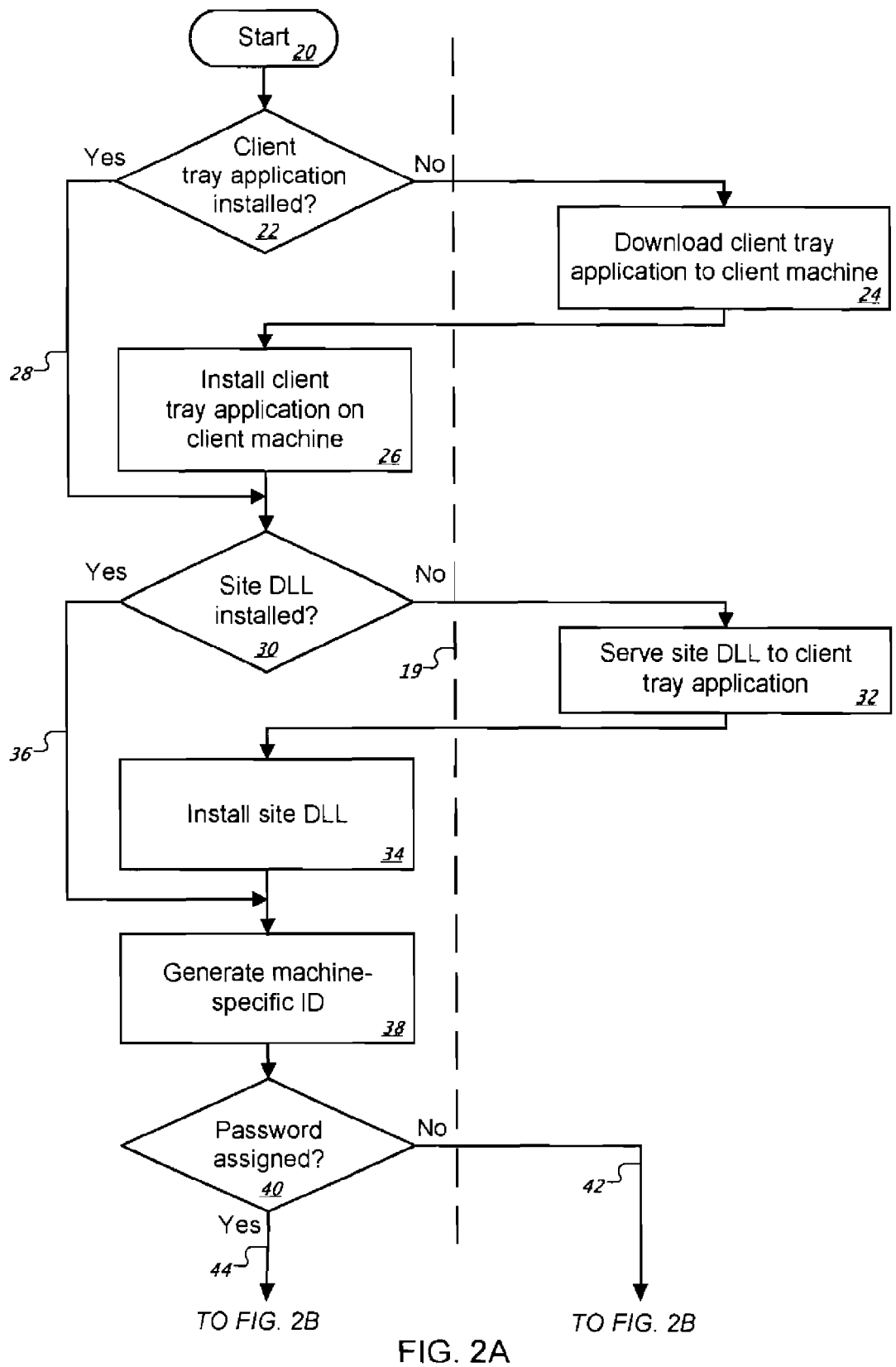
FIGS. 2A, 2B, and 2C collectively form a flowchart that illustrates the steps performed by a preferred embodiment of the present invention.

The client tray application, together with the client machine key DLL, determines the identity of the client-machine and other unique information including the "authorization rights/status of the client-machine" relative to the current server or content cluster being accessed. The step of generating machine-specific identification is represented in FIG. 2A by block 38. In the preferred embodiment, this step is achieved by using a software application package known as SoftSentry software, or a similar application, in conjunction with the client tray application. The client machine key DLL (typically generated by the Web site administrator using SoftSentry software) analyzes hardware characteristics of a particular local computer, or client machine (including hard drive characteristics, RAM characteristics, input/output device parameters and other hardware specific details), and thereby generates an integer value, or machine-specific identifier that is virtually unique for a given client machine. The client machine key DLL then performs an algorithm to calculate a password, based upon the machine-specific identifier, valid only for a client machine having the same virtually unique system identifier. As a result, even if the client tray application (and/or client machine key DLL) is copied by a user to a second client machine, the client machine key DLL on the second client machine will report a new machine-specific identifier that is almost certainly different from the machine-specific identifier that was generated by the user's first client machine.

The first time that the client machine key DLL for the Web site currently being accessed is queried by the system tray application, the client tray application needs to transmit the machine-specific identifier (computed by the client machine key DLL) to the server as indicated by arrow 42 in FIG. 2A, in order to request a password. The request for a password can be done manually by the user by telephone, telefax, email etc. Alternatively, the request for a password can be transmitted directly over the network. Likewise, the assignment of such password can be handled automatically by the server side application software, without human intervention, and transmitted over the network directly to the client machine; alternatively, the password can be provided by a human system administrator to the user via telephone, email, telefax, by mail, or by similar means. In either case, the server side application software and/or human administrator of the server system applies an algorithm to the machine-specific identifier received from the client machine and/or client machine user to compute a password for such client machine, as illustrated by block 46 in FIG. 2B.

In one preferred embodiment of the present invention, the server application software issues passwords to client machines in the following manner: A user who wishes access to protected data will visit a Web page (i.e., a Web page maintained by a server running the server side application software), as by entering a URL directly into the user's Web browser, via clicking on a Web link, via clicking on a "subscribe now" button on the client-machine key DLL user interface, etc., for allowing a user to place an online "order" for access to the protected data maintained by such server. The user manually enters the user's credit card information and email address for transmission to the server side application software. In addition, the user transmits to the server side application software the user's client-machine system identifier generated in block 38 of FIG. 2A, as by clicking on a "button" displayed by the client-machine key DLL user interface, for instance; of course, this step is not necessary if the user's client-machine system identifier was previously passed to the server side application software during the current browsing session (manually or automatically). Upon credit-card processing approval, a client-machine key DLL password is transmitted by the server side application software, via email, to the user. In some cases, the ordering process may allow the user to select from a variety of subscription lengths and/or access levels (standard, advanced, etc.), presumably with different prices associated with each. The particular options selected by the user then dictate the specific client-machine key DLL password that is issued to such user.

Figure 2B:
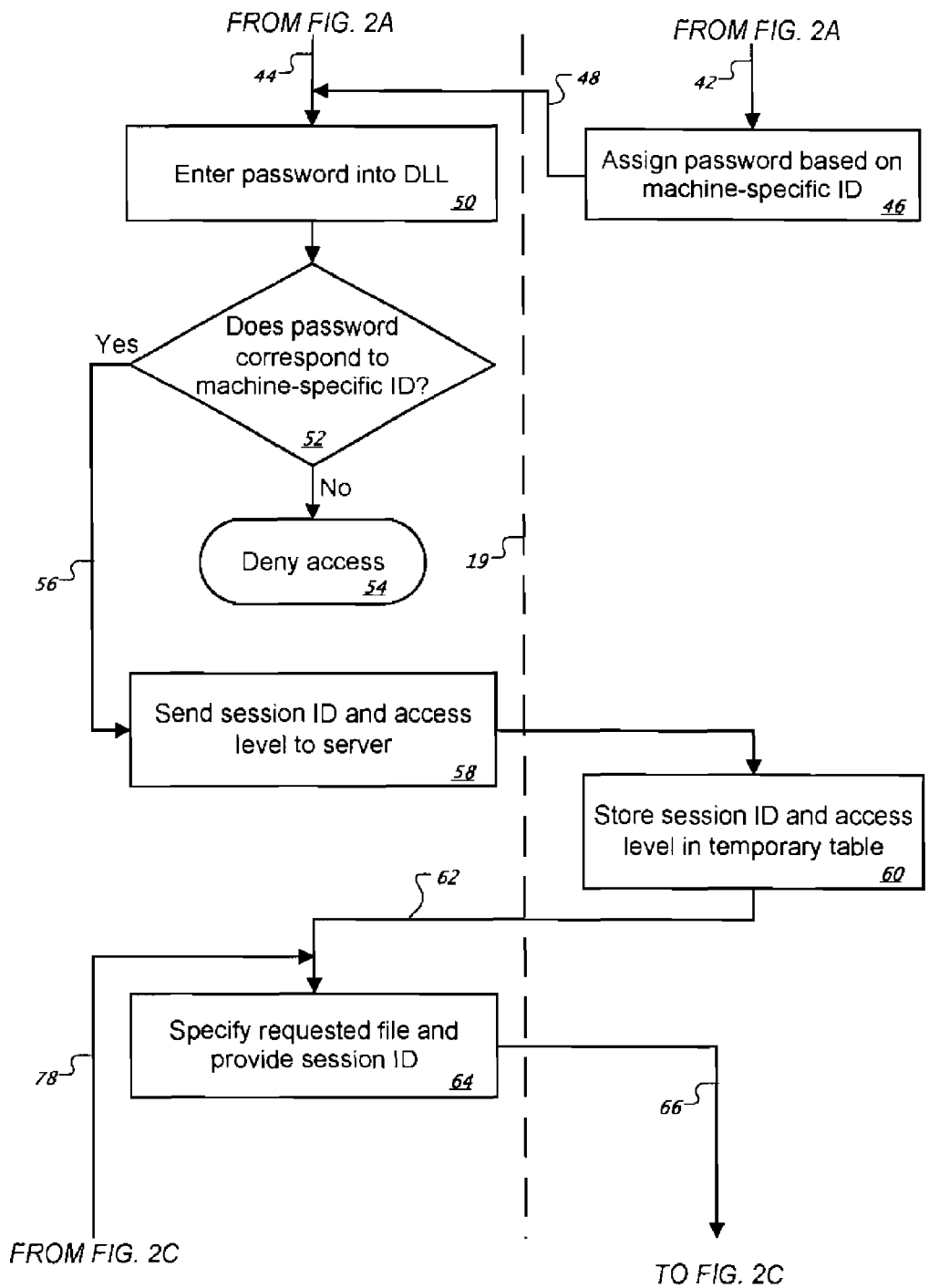
Figure 2C:
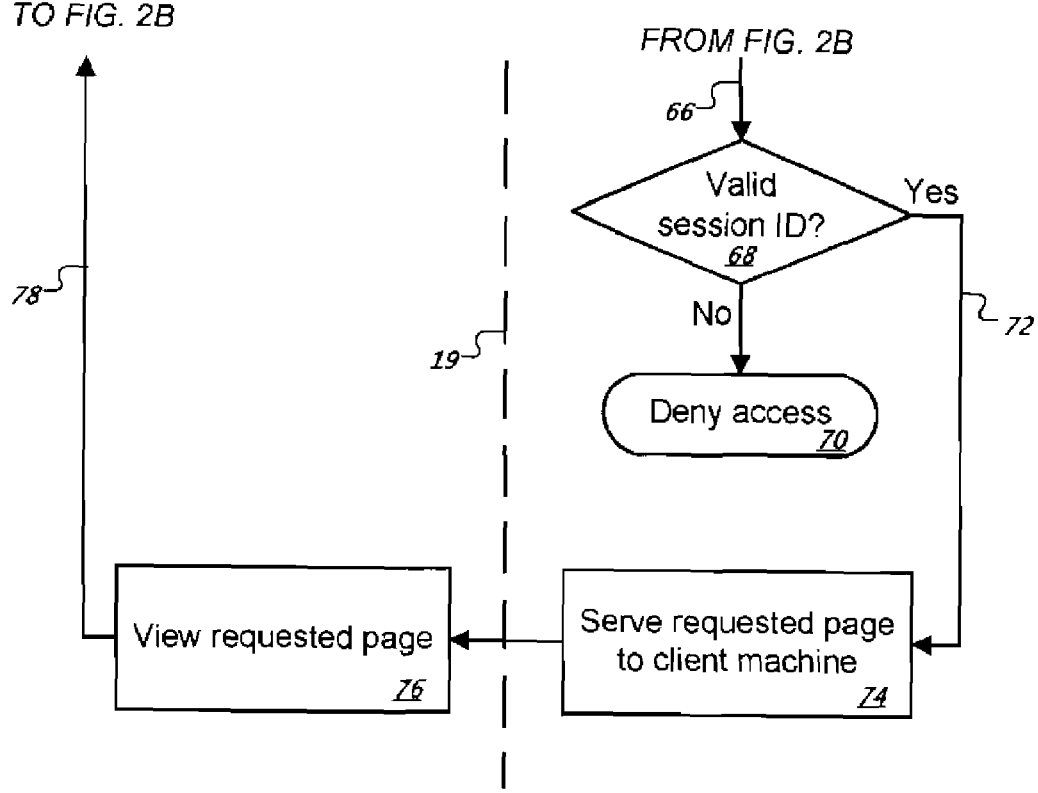

A user is then prompted by the client machine key DLL to enter a password into the client machine, which, if valid, is saved for future reference by the aforementioned site/cluster-specific, client machine key DLL, as indicated by block 50 in FIG. 2B. If a valid password (discussed below)

is not entered, then future attempts to access such Web site are denied pending entry of a valid password.

At this point, it might be noted that the client machine key DLL could be configured to accept two or more alternate passwords for a given protected site, Web page, or cluster. Different passwords could be used to convey different subscription terms (one year, two years, etc.) or different access levels. The server administrator, or the automated payment/password issuing system (described above) selects the appropriate password to be conveyed to the user.

The next step in the validation process is for the client machine key DLL to compare the password computed by the client machine key DLL in step 38 with the password information entered by the user in step 50, as indicated by decision diamond 52. If the validation fails, then access to the protected Web page is denied, as indicated by termination step 54. However, if the validation is successful, then the aforementioned Java® applet transmits the aforementioned session i.d. and authorized access level to the temporary storage table, located on a remote server, over the network, as indicated by block 58 in FIG. 2B. The server on which the temporary storage table is maintained (this need not be the same server as the server which serves the protected Web pages) has an application program (referred to herein as the "temporary storage table application") installed and running thereon which controls reading from, and writing to, such temporary storage table.

As mentioned above, the temporary storage table application maintains a temporary data table of authorized, logged-on users, including, among other things, any related access level information for such users. When a validated client machine transmits its session identifier and access level to the temporary storage table application (see step 58), this data is temporarily saved in the temporary storage table, as indicated by block 60. The temporary storage table application performs local checks of the data received from the client tray application to determine that it is originating from the authorized client-machine, preventing the insertion of "spoof" client-machine authorizations into the server application's temporary database. Following storage of the client-machine authentication data in the temporary storage table, future requests by the client for file/data access can easily be processed because each such file/data request incorporates this session identifier information.

When a user requests remote files via a Web browser, the user's browser on the client machine sends HTTP header data taken from a browser "cookie" that contains the session i.d. information to the Web server as a means of identifying the client machine, as indicated by block 64 and arrow 66. The user's browser also specifies the address/file name of the secured page that the user is attempting to access. The secured page's code now interacts with the ActiveX Dynamic Link Library (ActiveX DLL) Object embedded in the secured Web page on the server. The code retrieves the session identifier information from the header included in the browser's "GET" request and then passes this session identifier information to the ActiveX DLL. The ActiveX DLL then prompts the temporary storage table application to search for matching session i.d. information, as designated by decision diamond 68. The temporary storage table application searches the temporary storage table for temporarily stored authentication data matching the passed session identifier information, and then responds with an "authorize client message," "deny client" message, "expired client" message and/or access-level data, and the ActiveX DLL then passes such response(s) to the secured page's code. If the secured page's code receives an indication that a valid/authorized session identifier was found (and that appropriate access level rights are indicated, if applicable), as represented by arrow 72, then the server login/connection, or content request, is granted, and the requested content is served to the user, as indicated by blocks 74 and 76. On the other hand, if the secured page's code receives an indication that: 1) the session identifier was not found in the temporary storage table; 2) the user is attempting to access a page beyond the scope of the user's access level rights; or 3) the user's subscription has expired, then the client-machine, and therefore the user, are denied access to the server or secured content, as represented by termination block 70. In this case, the client machine's browser is redirected to a notification page, where the user receives information about why access was denied.

If desired, custom code can be incorporated into the server application software to query a user database or other objects. This custom code can be used to control such things as subscription expirations, user authentication passwords, and the like by nesting "if . . . then" statements outside of the secured page's code. In other words, the present invention can optionally be coupled with user authentication/security technologies to provide additional levels of security. If an administrator couples user authentication with the present invention, then stolen authorized client-machines and unauthorized users with access to authorized client-machines do not present a security threat.

Moreover, it will be noted that the temporary storage table application software is multi-thread capable, and maintains a list of temporarily authorized clients. Multiple client-side/server-side combinations may be running simultaneously on any user/server machine. In other words, a user can have multiple simultaneous "client machine keys" installed on his computer, allowing access to one or more protected Web sites and/or Web pages ("clusters") at any given time. In the same spirit, a Web server can host multiple unique server data "locks," acting as a sentry to multiple unique Web sites/Web pages ("clusters") simultaneously. As mentioned above, the same client-side tray application software can be used to control access by a particular client machine to one or more protected sites and/or services. The client machine simply has one or more client machine key DLLs, and the client machine is issued a unique password for each such client machine key DLL, corresponding to each such protected site and/or service ("cluster").

It will also be noted that the present invention does not require a pre-populated database of any kind on any server. In contrast, most user authentication technologies require constant administration of a user database to control access to a server and/or server resources. Instead, the present invention uses dynamic information from the client-machine to automatically insert "temporary records" into an administration-free database table on a server storing a list of temporarily authorized client-machines.

The present invention can be used with any type of third-party server (WWW, FTP, mail, database, telnet, gopher, etc.) capable of tracking session identifier information and processing custom code. Because the present invention works as an add-on/plug-in to third-party servers, server administrators and users do not lose any of the functionality or features of the server being used to serve the data/content to the user. This is in contrast to many security solutions that employ a proprietary server to serve secured content to the end-user. Web page data protected by the present invention can be accessed by any authorized client-machine using browser software capable of communicating with the aforementioned client tray application, all without any need for additional coupling tools. For example, the aforementioned Java® applet facilitates any Java® 1.1 capable Web browser's communication with the client tray application. Some types of network communication client applications (including FTP, mail, database, telnet, gopher, etc. but not necessarily including Java 1.1 capable web browsers) may require additional coupling tools (plug-ins or patches for example) to leverage the security of the present invention. Custom network communication client applications (including WWW, FTP, mail, database, telnet, gopher, etc.) could also be developed specifically designed to leverage the security of the present invention all without any need for additional coupling tools.

The present invention is ideally suited to be used by Web server administrators having Internet or Intranet Web pages/sites who require total control over access to a company's Web servers and/or Web services. It provides greater security than known hardware-lock (or dongle) type systems, since it limits access to specific client machines. Accordingly, it is ideally suited for use with subscription-type Web sites, on-line banking sites, and for remote logins by travelers and telecommuters to corporate intranets. Under conditions of solid network connectivity, the entire authentication process practiced by the present invention executes very quickly.

Those skilled in the art will note that there are differences between Web page access and FTP file transfer service. Web pages make use of a "stateless" protocol wherein the Web browser on the client machine is not connected continuously to the server for the entire duration of a browsing session. For example, when a remote user first connects to a Web page served by a Microsoft Internet Information Server (IIS®) software, the remote user's browser connects with the home page of the addressed site, gets the page, then disconnects from such site. When the remote users click on a link on such home page, the remote user's browser connects with the linked Web page, gets the page, then disconnects again. The session identifier and temporary storage table are used to track and authenticate each of those connections. In contrast, an FTP Client is connected to the FTP Server during the entire session. Authentication need only be done at the beginning of the session, and hence, there is no need for a temporary storage table to temporarily save authenticated browsing session identifiers. In the FTP protocol environment, all that is needed is an FTP client and an FTP server; the FTP client needs to know how to communicate directly with the client machine tray application. It will be recalled from above that Java® Applets can be used for such purpose in a Web browser environment, but Java® Applets can only be run in a web browser, and not in an FTP client. Likewise, the FTP server needs to know how to communicate with the FTP client to authenticate the client machine. However, by making use of the present invention in the FTP environment, the user can avoid the need to use a username and password to log into the FTP server, as they typically do now.

Those skilled in the art will now appreciate that a novel and improved client/server authentication system has been described which provides an increased level of security, without requiring a user to possess any special hardware components, or "dongles", in order to gain access to the server. Moreover, the present invention serves to restrict a client to a particular machine in order to gain access to a Web site and/or Web pages on an Internet and/or intranet site. In addition, the authentication system of the present invention easily allows for multiple levels of access wherein some authorized users have greater access to Web pages than other authorized users. All of these advantages are provided without the disadvantage of burdening the server computer with the need to maintain a pre-populated database of authorized users. While the present invention has been described with respect to preferred embodiments thereof, such description is for illustrative purposes only, and is not to be construed as limiting the scope of the invention. Various modifications and changes may be made to the described embodiments by those skilled in the art without departing from the true spirit and scope of the invention as defined by the appended claims.

We claim:

1. A method of restricting access to data maintained on a server computer by an authorized client machine, said method comprising the steps of:
   a. installing a client-side software program on the client machine for generating a client machine-specific identifier, the client machine-specific identifier being substantially unique to the particular machine upon which such client-side software program is initially installed;
   b. operating the client-side software program on the client machine to generate the client machine-specific identifier;
   c. generating a password remote from the client machine and providing the password to a user of the client machine, the password being derived from the client machine-specific identifier generated in step b., and uniquely corresponding thereto;
   d. issuing a request by the client machine to the server computer for access to data maintained on the server computer;
   e. responding to the request for access of step d. by having the client machine re-generate its machine-specific identifier;
   f. verifying on the client machine whether the client machine-specific identifier re-generated in step e. uniquely corresponds with the password generated in step c.; and
   g. recognizing the client machine as being authorized to access data maintained on the server computer if the verification performed by step f. is true, and refusing to recognize the client machine as being authorized to access data maintained on the server computer if the verification performed by step f. is false.

2. The method recited by claim 1 including the step of installing a server-side software program on a server computer, remote from the client machine, for generating the password generated in step c. of claim 1.

3. The method recited by claim 2 wherein the server-side software program is installed on the server computer that maintains the data which the client machine is trying to access.

4. The method recited by claim 1 wherein the step of generating a password remote from the client machine is performed by a computer other than the server computer that maintains the data which the client machine is trying to access.

5. The method recited by claim 1 wherein the step of installing the client-side software program on the client machine includes the step of downloading the client-side software program from the server computer.

6. The method recited by claim 1 wherein the step of generating a password remote from the client machine includes the step of transmitting the client machine-specific identifier generated in step b. to a password-generating computer other than the client machine, and generating the password at the password-generating computer.

7. The method recited by claim 6 wherein the password-generating computer is the sewer computer that maintains the data which the client machine is trying to access.

8. The method recited by claim 6 wherein the password-generating computer is adapted to perform an algorithm for generating the password based upon the client machine-specific identifier generated in step a. of claim 1.

9. The method recited by claim 1 further including the steps of:
  h. obtaining a session identifier and a site identifier from the client machine each time the client machine requests access to restricted data area of the server computer, the session identifier indicating a particular working session by the client machine, and the site identifier indicating a particular data area of the server computer which the client machine is authorized to access;
  i. storing the session identifier and site identifier in a temporary storage table remote from the client machine upon a first request by the client machine for access to a restricted data area of the server computer;
  j. comparing the session identifier obtained from the client machine upon subsequent requests for access to the restricted data area of the server following the first request; and
  k. allowing the client machine continued access to the restricted data area of the server computer if the session identifier obtained from the client machine upon a subsequent request corresponds to a session identifier already stored in the temporary storage table.

10. The method recited by claim 1 wherein each client machine is only authorized to access particular data areas of the server computer, and wherein the client-side software program installed on the client machine determines which areas of the server computer can be accessed by a particular client machine.

11. A method of restricting access to data maintained on a server computer by an authorized client machine, said method comprising the steps of:
  a. creating a session identifier in a computer remote from the client machine for a current browsing session of the client machine;
  b. transmitting to the client machine the session identifier created in step a.;
  c. storing the session identifier transmitted in step b. within the client machine;
  d. verifying, on the client machine, that the client machine is authorized to access data maintained on the server computer;
  e. obtaining the session identifier stored in step c., and storing such session identifier within a storage table remote from the client machine if such client machine was verified in step d.;
  f. transmitting a request by the client machine for access to data maintained on the server computer, such request including the session identifier stored in step c.;
  g. comparing the session identifier transmitted in step f. with the session identifier stored in the storage table during step e. to determine whether the request for access transmitted in step f. is authorized; and
  h. permitting access by the client machine to the requested data maintained on the server computer if the comparison made in step g. shows that the request for access is authorized, and denying access by the client machine to the requested data maintained on the server computer if the comparison made in step g. shows that the request for access is not authorized.

12. The method recited by claim 11 wherein the session identifier stored on the client machine in step c. is stored as a temporary file on the client machine.

13. The method recited by claim 12 wherein the temporary file which stores the session identifier on the client machine comprises a cookie.

14. A computer program product tangibly embodied in an information carrier, the computer program product including instructions that, when executed, perform operations for restricting access to data maintained on a server computer, the method comprising:
  a. receiving a request from a client machine for access to data stored on a server;
  b. generating a password remote from the client machine, and providing the password to the client machine or to a user of the client machine, the password being derived from, and corresponding to, a client machine-specific identifier generated on the client machine;
  c. transmitting to the client machine instructions to re-generate the password and to verify, on the client machine, whether the client machine-specific identifier uniquely corresponds with the password generated at step b.; and
  d. allowing access to the data if the verification performed by step c. is true, and denying access to the data if the verification performed by step c. is false.

15. A method for determining authorization to access data, comprising:
  a. receiving, from a client machine, a request for data on a server;
  b. verifying on the client machine the existence of, or providing to the client machine, a client application that is adapted to calculate, with a client-machine key, a machine-specific identifier;
  c. transmitting, to the client machine, the client-machine key, if the client machine did not contain the client-machine key when the request for data was received;
  d. generating a password remote from the client machine and providing the password to the client machine or to a user of the client machine, the password being derived from, and corresponding to, the machine-specific identifier;
  e. receiving, from the client machine, the machine-specific identifier, verified by the client machine by re-generation of the machine-specific identifier using the client application and client-machine key; and
  f. allowing access to the data on the server if the verification in step e. is true, and not allowing access to the data on the server if the verification in step e. is false.

16. The method of claim 15, wherein the client-machine key is a dynamic link library (DLL).

17. The method of claim 15, wherein the client-machine key is configurable to allow access to data based on rules selected from the group consisting essentially of: subscription type, access level, security level, subscription term, date, and time.

18. The method of claim 15 wherein the client-machine key is configurable to accept a plurality of alternate passwords for protected sites, pages, or clusters.

* * * * *

UNITED STATES PATENT AND TRADEMARK OFFICE
CERTIFICATE OF CORRECTION

PATENT NO.        : 7,249,262 B2                                    Page 1 of 1
APPLICATION NO.   : 10/139924
DATED             : July 24, 2007
INVENTOR(S)       : Leon E. Hauck and Brent Burval It is certified that error appears in the above-identified patent and that said Letters Patent is hereby corrected as shown below:

Title Page, item (56); References Cited, Other Publications, please insert

--SoftSentry Software Protection by 20/20 Software, Internet Web site description--;

Title Page, item (56); References Cited, Other Publications, please insert

--Sitelok by Softlok International Ltd., product brochure, copyright 1998--.

Signed and Sealed this

Second Day of September, 2008

JON W. DUDAS
*Director of the United States Patent and Trademark Office*